UNITED STATES PATENT OFFICE.

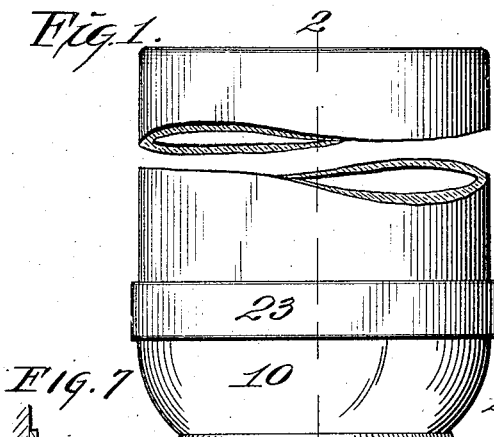

JOHAN F. FRANKE, OF SANTA ANA, CALIFORNIA.

DISPENSING DEVICE.

1,405,197. Specification of Letters Patent. Patented Jan. 31, 1922.

Application filed January 18, 1921. Serial No. 438,226.

*To all whom it may concern:*

Be it known that I, JOHAN F. FRANKE, a citizen of the United States, residing at Santa Ana, in the county of Orange and State of California, have invented new and useful Improvements in Dispensing Devices, of which the following is a specification.

My invention relates to dispensing devices of the type usually employed in households for containing pulverized or granular substances that are utilized as food or in the preparation of food or beverages, the principal object of my invention being to provide a relatively simple and efficient dispensing device that is constructed so as to permit of its being easily and cheaply produced, and said device being formed so that when set up for use, it presents a neat and finished appearance.

Further objects of my invention are to provide simple and efficient means for firmly holding the main container of the device, to provide a readily detachable cap for closing the opening at the lower end of the main container, to equip a removable cap with a simple form of valve for controlling the discharge of pulverized or granular material from the container, and, further, to arrange on the under side of the cap simple means for receiving and holding a receptacle such as a measuring cup, into which latter the material from the main container discharges when the valve is open.

A still further object of my invention is to construct a dispensing device so that when the discharge control valve is closed, a practically air tight chamber is provided within the main container of the device, thereby providing a structure that is especially desirable for containing and dispensing products such as ground coffee, tea and the like, or any products which tend to lose their strength and aroma when exposed to the air.

With the foregoing and other objects in view, my invention consists in certain novel features of construction and arrangement of parts as will be hereinafter more fully described and claimed and illustrated in the accompanying drawings in which:

Figure 1 is a front elevational view of a dispensing device constructed in accordance with my invention.

Figure 2 is a vertical section taken on the line 2—2 of Fig. 1.

Figure 3 is a perspective view of the supporting frame for the main container of the dispensing device.

Figure 4 is a perspective view of the plate that is applied to the closure cap on the lower end of the main container, and which plate is provided with means for receiving and supporting a receptacle such as a measuring cup.

Figure 5 is a horizontal section taken on the line 5—5 of Fig. 2.

Figure 6 is an elevational view of a modified form of dispensing device embodying my invention.

Figure 7 is a detail sectional view showing a modified form of supporting means for the container of the device.

Referring by numerals to the accompanying drawings which illustrate a practical embodiment of my invention, 10 designates a receptacle or container, the same being preferably constructed of glass, and in the form of the ordinary glass jars that are generally utilized for preserving fruits, vegetables and the like, said jar or container having a reduced neck portion 11 that is externally threaded in order to receive a metal cap 12. This metal cap includes a plate or disc 13, in which is formed a centrally arranged opening 14, the same serving as a discharge outlet for the pulverized or granular material that is contained within the jar or receptacle 10.

Formed in the annular wall of the cap 12 adjacent to plate 13 is a bearing 15, through which is arranged to slide a rod 16, and the latter carrying at its outer end a knob or button 17. Secured to the inner end of sliding rod 16 is a disc 18 that normally lies directly against the inner face of plate 13, and said disc serving as a movable closure for discharge opening 14.

Secured to the under side of plate 13 in any suitable manner, preferably by means of rivets or solder, is a disc 19 having on its side and rear edges depending inwardly turned lips 20, the same being adapted to receive the annular flange or bead 21 that is formed on the upper end of a receptacle 22, the same being preferably formed of glass or analagous transparent material. I prefer to form this receptacle 22 with a graduated scale, the marks of the latter being arranged to designate either dry or liquid measurements or weights, depending, of course, upon the material or food product that is to be stored in the container 10, and thus the receptacle 22 may be utilized as a measuring cup. Formed in the center of disc 19 is an aperture 19$^a$ that coincides with discharge opening 14 when disc 19 is properly positioned upon disc 13.

The supporting fixture for the device includes a metal ring 23 of sufficient diameter to encircle the body of the jar or receptacle 10, and said ring being positioned in the offset portion 24 of an upright bar or plate 25 of metal, the lower end of which, or that portion below the offset portion 24, being curved outwardly, as designated by 26, and the lower end of said curved portion being transversely curved, as designated by 27.

Plate 25 is provided with apertures 28 that are adapted to receive screws or like fastening devices, and the lower one of these apertures coincides with an aperture formed in the ring 23, and thus when a fastening device is passed through the coinciding apertures, and into a wall or the like, it serves to secure the ring 23 to member 25 and to also assist the upper one of the screws or fastening devices, in firmly anchoring the fixture to the wall.

When the jar or container 10 is positioned in the ring 23, the curved lower edge 27 of the curved portion 26 of the bar 25 engages the outer surface of cap 12 between a pair of the threads thereon, and thus serves to firmly retain the device in position within the fixture.

In the use of my improved dispensing device the receptacle 22 is positioned against the under side of the disc 19, and moved rearwardly thereupon so as to position the flange or rib 21 within the retaining lips 20, after which knob or button 17 is engaged and pulled forwardly, thereby correspondingly moving the disc 18 so as to uncover the discharge openings 14 and 19$^a$ that are formed respectively in discs 13 and 19. A portion of the pulverized or granular contents of jar or container 10 will now discharge through the openings 14 and 19$^a$, and when the desired amount of material has been discharged into the container 22, disc 18 is moved rearwardly into position to cover the discharge opening, thereby cutting off the passage or flow of material therethrough.

When the disc 18 is positioned over the discharge openings, the chamber within jar or container 10 is practically air tight, and, as a result of this condition, there will be very little, if any, deterioration of the contents of the jar, due to loss of strength or flavor. Further, as the material is contained in a substantially air tight container, it will not be affected by moisture.

If desired, the principles of my improved invention may be incorporated in an ornamental dispensing device, having the general arrangement and configuration, as illustrated in Fig. 6.

In this form of device, the main container 30 is substantially spherical in form, and it is suspended from its upper end from the horizontally disposed frame of an inverted L-shaped bracket 31.

In Fig. 7, I have illustrated a modified form of the bracket or fixture for supporting the device, and which modified construction includes a substantially straight attaching plate 32, having an offset or indented portion 33 that is adapted to receive the ring 34 that encircles the body of the container, and said body being provided on its outer surface with an annular bead 35 that is adapted to rest directly on top of said ring 34.

A dispensing device of my improved construction is comparatively simple, is constructed so as to be easily and cheaply produced, can be readily manipulated so as to discharge any desired portion of the material contained within the main receptacle, and said device, when properly constructed and mounted, presents a neat and finished appearance, and provides a very convenient household utensil.

It will be readily understood that minor changes in the size, form and construction of the various parts of my improved invention may be made and substituted for those herein shown and described without departing from the spirit of my invention, the scope of which is set forth in the appended claim.

I claim as my invention:

In a dispensing device, the combination with a receptacle having an externally threaded neck, of a cap adapted to be screw seated on said neck, said cap having a centrally arranged discharge opening, a rod arranged for sliding movement through the side wall of the cap, a disk carried by the inner end of said rod and adapted to normally close the discharge opening in said cap, a plate secured to the under side of the cap which plate is provided with an opening that coincides with the discharge opening in the cap and depending inwardly curved lips formed on the edge of said plate, which lips are adapted to receive and retain the flange of a removable receptacle.

In testimony whereof I have signed my name to this specification.

J. F. FRANKE.